(12) United States Patent
Mitake et al.

(10) Patent No.: US 8,836,271 B2
(45) Date of Patent: Sep. 16, 2014

(54) METHOD AND SYSTEM FOR CHARGING TRANSPORTATION VEHICLE WITHOUT CONTACT WIRE

(75) Inventors: Masaya Mitake, Hiroshima (JP); Katsuaki Morita, Hiroshima (JP); Hiroshi Ogawa, Mihara (JP); Tetsuo Takata, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 377 days.

(21) Appl. No.: 13/139,178

(22) PCT Filed: Sep. 17, 2009

(86) PCT No.: PCT/JP2009/066218
§ 371 (c)(1),
(2), (4) Date: Jun. 13, 2011

(87) PCT Pub. No.: WO2010/100776
PCT Pub. Date: Sep. 10, 2010

(65) Prior Publication Data
US 2011/0309791 A1 Dec. 22, 2011

(30) Foreign Application Priority Data
Mar. 6, 2009 (JP) ................. 2009-053107

(51) Int. Cl.
*H02J 7/00* (2006.01)
*H01M 10/48* (2006.01)
*B60L 11/18* (2006.01)
*H02J 7/02* (2006.01)
*H02J 7/04* (2006.01)
*H01M 10/44* (2006.01)

(52) U.S. Cl.
CPC ............ *H02J 7/025* (2013.01); *B60L 11/1818* (2013.01); *B60L 11/1816* (2013.01); *Y02E 60/12* (2013.01); *Y02T 90/14* (2013.01); *Y02T 90/122* (2013.01); *H02J 7/045* (2013.01); *Y02T 90/121* (2013.01); *Y02T 10/7005* (2013.01); *H01M 10/44* (2013.01); *Y02T 10/7088* (2013.01)
USPC ........... 320/104; 320/109; 320/107; 320/134; 320/138; 320/119

(58) Field of Classification Search
USPC ......... 320/108, 115, 107, 134, 106, 148, 149, 320/156, 157, 104, 119
See application file for complete search history.

(56) References Cited

U.S. PATENT DOCUMENTS 6,741,065 B1 * 5/2004 Ishii et al. ..................... 320/122
7,582,979 B2 * 9/2009 Oyobe et al. .................. 290/1 R (Continued)

FOREIGN PATENT DOCUMENTS

JP 2000-083302 A 3/2000
JP 2002-315216 A 10/2002

(Continued)

OTHER PUBLICATIONS

Office Action for Japanese Application No. 2009-053107 mailed Dec. 4, 2009.
International Search Report for PCT/JP2009/066218 mailed Dec. 8, 2009.

(Continued)

*Primary Examiner* — Edward Tso
*Assistant Examiner* — Alexis Boateng
(74) *Attorney, Agent, or Firm* — Lowe Hauptman & Ham LLP

(57) ABSTRACT

A charging method is used for a transportation vehicle without a contact wire. The transportation vehicle is configured so that when a vehicle (1) equipped with an energy storage device (5) stops at a station on a track (2), the energy storage device (5) of the vehicle (1) is charged by a charging device (9) provided on a ground side. The charging method includes charging, by the charging device (9), the energy storage device (5) with a voltage set value (VS) which is near a maximum allowable voltage value (VH) of the energy storage device (5).

4 Claims, 3 Drawing Sheets

(56) References Cited

U.S. PATENT DOCUMENTS

| | | | |
|---|---|---|---|
| 2002/0190690 A1* | 12/2002 | Tamai et al. | 320/103 |
| 2004/0169489 A1* | 9/2004 | Hobbs | 320/104 |
| 2008/0084179 A1* | 4/2008 | Emori et al. | 320/109 |
| 2008/0157539 A1* | 7/2008 | Tani et al. | 290/40 |
| 2009/0079389 A1* | 3/2009 | Ohtomo | 320/109 |
| 2009/0096410 A1* | 4/2009 | Sakurai | 320/104 |
| 2009/0174365 A1* | 7/2009 | Lowenthal et al. | 320/109 |
| 2009/0195219 A1 | 8/2009 | Morita et al. | |
| 2010/0156355 A1* | 6/2010 | Bauerle et al. | 320/145 |
| 2011/0109267 A1* | 5/2011 | Morita et al. | 320/109 |

FOREIGN PATENT DOCUMENTS

| | | |
|---|---|---|
| JP | 2006-054958 A | 2/2006 |
| JP | 2006-219128 A | 8/2006 |
| JP | 2007-189768 A | 7/2007 |
| JP | 2007-202335 A | 8/2007 |
| JP | 2008-141846 A | 6/2008 |

OTHER PUBLICATIONS

Notice of Allowance mailed Jul. 4, 2013 corresponds to Chinese patent application No. 200980153397.5.

* cited by examiner

METHOD AND SYSTEM FOR CHARGING TRANSPORTATION VEHICLE WITHOUT CONTACT WIRE

RELATED APPLICATIONS

The present application is a National Phase of International Application Number PCT/JP2009/066218, filed Sep. 17, 2009 and claims priority from, Japanese Application Number 2009-053107, filed Mar. 6, 2009.

TECHNICAL FIELD

The present invention relates to a transportation system without a contact wire in which a vehicle equipped with an energy storage device runs on a track, and more specifically, relates to a charging method and a charging system for charging an energy storage device of a transportation vehicle without a contact wire.

BACKGROUND ART

In recent years, in a transportation system in which a vehicle runs on a set track, a transportation system without a contact wire, which is configured so that a vehicle runs without receiving power supply from the contact wire, has been put into a practical use.

The vehicle in such a transportation system includes an energy storage device (e.g., a battery) for storing power, and the vehicle stores the power in the energy storage device when the vehicle stops at a station, thereby being capable of running on the set track. On the other hand, each station on the track is provided with a charging device, and when the vehicle stops at the station, the charging device supplies power to the energy storage device of the vehicle (e.g., Patent Document 1).

For example, in Patent Document 1, the vehicle in the transportation system without the contact wire includes an energy storage device and an on-board control device for controlling a charging voltage, a charging period, and the like of the energy storage device. On the other hand, the stations on the track are each provided with a power feeding installation (charging device). When the vehicle stops at the station for receiving the power, the power feed installation starts the charging of the energy storage device in response to an instruction from the on-board control device installed in the vehicle. Then, if a power storage amount of the energy storage device reaches a predetermined value, the on-board control device issues a command to stop receiving power, to thereby stop the charge of the energy storage device.

CITATION LIST

Patent Document

Patent Document 1: JP 2000-83302 A

SUMMARY OF INVENTION

Technical Problem

In general, the energy storage device has a preset maximum allowable voltage value and a preset minimum allowable voltage value. In the energy storage device, in a situation in which the voltage value of the energy storage device falls out of the range between the maximum allowable voltage value and the minimum allowable voltage value, an interlock function in the energy storage device operates to disable the energy storage device. Therefore, while the vehicle is in service, it is necessary to maintain the voltage value of the energy storage device between the maximum allowable voltage value and the minimum allowable voltage value.

However, if the voltage value of the energy storage device is low at the time of leaving a station, the following problem may occur.

As illustrated in FIG. 4, when the vehicle leaves the station, the energy storage device outputs a high current for powering the vehicle, and hence a voltage value V of the energy storage device reduces greatly toward a minimum allowable voltage value VL. In the example illustrated in FIG. 4, the voltage value V of the energy storage device at the time of leaving the station is in a low state, and hence when the voltage value V of the energy storage device reduces during powering of the vehicle, a margin $VL_m$ between the voltage value V of the energy storage device and the minimum allowable voltage value VL is reduced.

In this way, if the margin $VL_m$ between the voltage value V and the minimum allowable voltage value VL is reduced, the voltage value V of the energy storage device becomes lower than the minimum allowable voltage value VL depending on its usage or environments, risking the interlock function operating to disable the energy storage device. Therefore, the energy storage device needs to be replaced, and the long-term use of the energy storage device has not been attained.

Furthermore, as another example, if the vehicle runs between the stations at different altitudes, the following problem may occur.

For example, in the case in which the vehicle runs from a high-altitude station toward a low-altitude station, when the vehicle leaves the high-altitude station, the vehicle runs to a low altitude, and hence high power is necessary to brake the vehicle. Therefore, as illustrated in FIG. 5, a high current returns to the energy storage device by regenerative braking, with the result that the voltage value V of the energy storage device increases greatly toward a maximum allowable voltage value VH. As illustrated in FIG. 5, if the voltage value V of the energy storage device increases greatly at the time of regenerative braking of the vehicle, the voltage value V of the energy storage device may exceed the maximum allowable voltage value VH.

As described above, if the voltage value V increases to be greater than the maximum allowable voltage value VH, the interlock function operates to disable the energy storage device. Therefore, the energy storage device needs to be replaced, and long-teen use of the energy storage device has not been attained.

The present invention has been made in view of the circumstances described above, and it is an object of the invention to provide a charging method and a charging system for a transportation vehicle without a contact wire, which are capable of prolonging the life of the energy storage device by controlling a voltage value with which the charging device charges the energy storage device.

Solution to Problem

In order to solve the above-mentioned problem inherent in the conventional technology, according to an aspect of the present invention, there is provided a charging method for a transportation vehicle without a contact wire, which is configured so that, when a vehicle equipped with an energy storage device stops at a station on a track, the energy storage device of the vehicle is charged by a charging device provided on a ground side, the charging method including charging, by the charging device, the energy storage device with a voltage set value which is near a maximum allowable voltage value of the energy storage device.

Furthermore, according to another aspect of the present invention, the charging by the charging device includes charging the energy storage device with such a voltage set value that a voltage value of the energy storage device during powering of the vehicle is greater than a minimum allowable voltage value of the energy storage device and the voltage value of the energy storage device during regenerative braking of the vehicle is less than the maximum allowable voltage value of the energy storage device.

Furthermore, according to another aspect of the present invention, there is provided a charging system for a transportation vehicle without a contact wire, which is configured so that, when a vehicle equipped with an energy storage device stops at a station on a track, the energy storage device of the vehicle is charged by a charging device provided on a ground side, and in which the charging device includes control means, and the control means controls such that the energy storage device is charged with a voltage set value which is near a maximum allowable voltage value of the energy storage device.

Furthermore, according to another aspect of the present invention, the control means controls such that the energy storage device is charged with such a voltage set value that a voltage value of the energy storage device during powering of the vehicle is greater than a minimum allowable voltage value of the energy storage device and the voltage value of the energy storage device during regenerative braking of the vehicle is less than the maximum allowable voltage value of the energy storage device.

Advantageous Effects of Invention

According to the charging method for a transportation vehicle without a contact wire according to the present invention, which is configured so that, when the vehicle equipped with the energy storage device stops at the station on the track, the energy storage device of the vehicle is charged by the charging device provided on the ground side, the charging device charges the energy storage device with the voltage set value which is near the maximum allowable voltage value of the energy storage device. Accordingly, the voltage value of the energy storage device at the time of leaving the station is greater than the conventional one. Therefore, when the vehicle leaves the station, even if the voltage value of the energy storage device reduces greatly toward the minimum allowable voltage value, the voltage value of the energy storage device can ensure a sufficient margin with respect to the minimum allowable voltage value of the energy storage device. Thus, there is no fear that the voltage value of the energy storage device will be less than the minimum allowable voltage value depending on usage or environment.

In this way, in the case in which the vehicle runs between a plurality of stations, the energy storage device can be used for a longer time within the range of the allowable voltage values, thereby prolonging the life (usable life) of the energy storage device.

Furthermore, according to the charging method for a transportation vehicle without a contact wire according to the present invention, the charging device charges the energy storage device with such a voltage set value that the voltage value of the energy storage device during powering of the vehicle is greater than the minimum allowable voltage value of the energy storage device and the voltage value of the energy storage device during regenerative braking of the vehicle is less than the maximum allowable voltage value of the energy storage device. Therefore, for example, when the vehicle leaves a high-altitude station toward a low-altitude station, even if the voltage value of the energy storage device increases greatly toward the maximum allowable voltage value, the voltage value of the energy storage device can ensure a sufficient margin with respect to the maximum allowable voltage value of the energy storage device. Thus, there is no fear that the voltage value of the energy storage device will be greater than the maximum allowable voltage value depending on usage or environment.

In this way, in the case in which the vehicle runs between a plurality of stations at different altitudes, the energy storage device can be used for a longer time within the range of the allowable voltage values, thereby prolonging the life of the energy storage device.

Furthermore, according to the charging system for a transportation vehicle without a contact wire according to the present invention, which is configured so that, when the vehicle equipped with the energy storage device stops at the station on the track, the energy storage device of the vehicle is charged by the charging device provided on the ground side, the charging device includes the control means, and the control means controls such that the energy storage device is charged with the voltage set value which is near the maximum allowable voltage value of the energy storage device. Accordingly, the voltage value of the energy storage device at the time of leaving the station is greater than the conventional one. Therefore, when the vehicle leaves the station, even if the voltage value of the energy storage device decreases greatly toward the minimum allowable voltage value, the voltage value of the energy storage device can ensure a sufficient margin with respect to the minimum allowable voltage value of the energy storage device. Thus, there is no fear that the voltage value of the energy storage device will become less than the minimum allowable voltage value depending on usage or environment.

In this way, in the case in which the vehicle runs between a plurality of stations, the energy storage device can be used for a longer time within the range of the allowable voltage values, thereby prolonging the life of the energy storage device.

Furthermore, according to the charging system for a transportation vehicle without a contact wire according to the present invention, the control means controls such that the energy storage is charged with such a voltage set value that the voltage value of the energy storage device while powering of the vehicle is greater than the minimum allowable voltage value of the energy storage device and the voltage value of the energy storage device during regenerative braking of the vehicle is less than the maximum allowable voltage value of the energy storage device. Therefore, for example, when the vehicle leaves a high-altitude station toward a low-altitude station, even if the voltage value of the energy storage device increases greatly toward the maximum allowable voltage value, the voltage value of the energy storage device can ensure a sufficient margin with respect to the maximum allowable voltage value of the energy storage device. Thus, there is no fear that the voltage value of the energy storage device will be greater than the maximum allowable voltage value depending on usage or environment.

In this way, in the case in which the vehicle runs between a plurality of stations at different altitudes, the energy storage device can be used for a longer time within the range of the allowable voltage values, thereby prolonging the life of the energy storage device.

DESCRIPTION OF EMBODIMENTS

Figure 1:
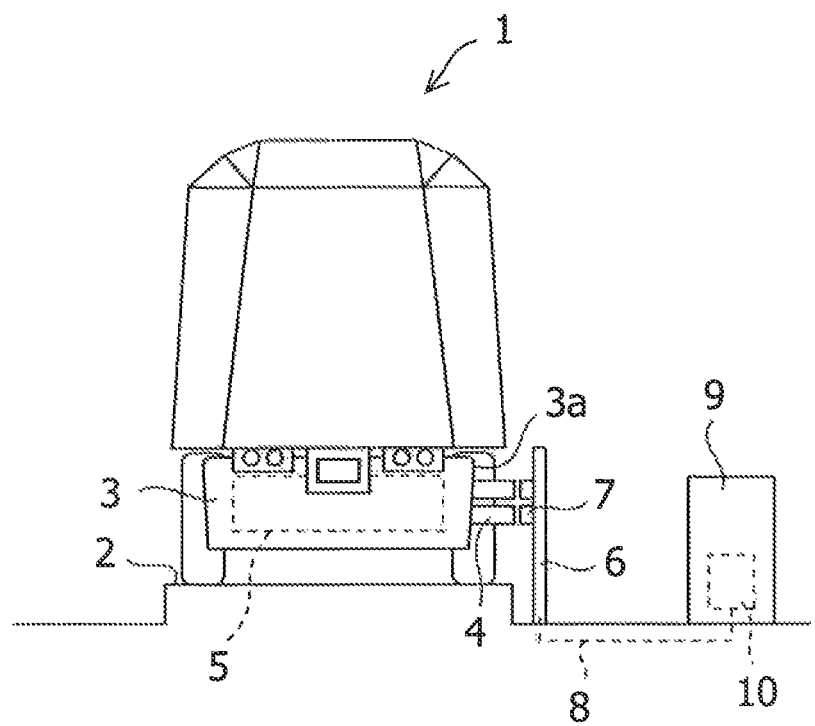
FIG. 1 A diagram of a vehicle in a transportation system without a contact wire according to embodiments of the present invention viewed in the running direction.

Referring to the drawings, a vehicle in a transportation system without a contact wire according to embodiments of the present invention is described below. FIG. 1 is a diagram of the vehicle in the transportation system without the contact wire according to the embodiments of the present invention viewed in the running direction.

As illustrated in FIG. 1, a vehicle 1 in the transportation system without the contact wire according to the embodiments of the present invention includes a truck 3 for running on a preset track 2. The truck 3 has a side surface 3a provided with a current collection contactor 4 for receiving power. Furthermore, the truck 3 includes an energy storage device 5 for storing the power received by the current collection contactor 4. The vehicle 1 stores power in the energy storage device 5 when stopping at a station (not shown), thereby being capable of running on the set track 2.

Figure 2:
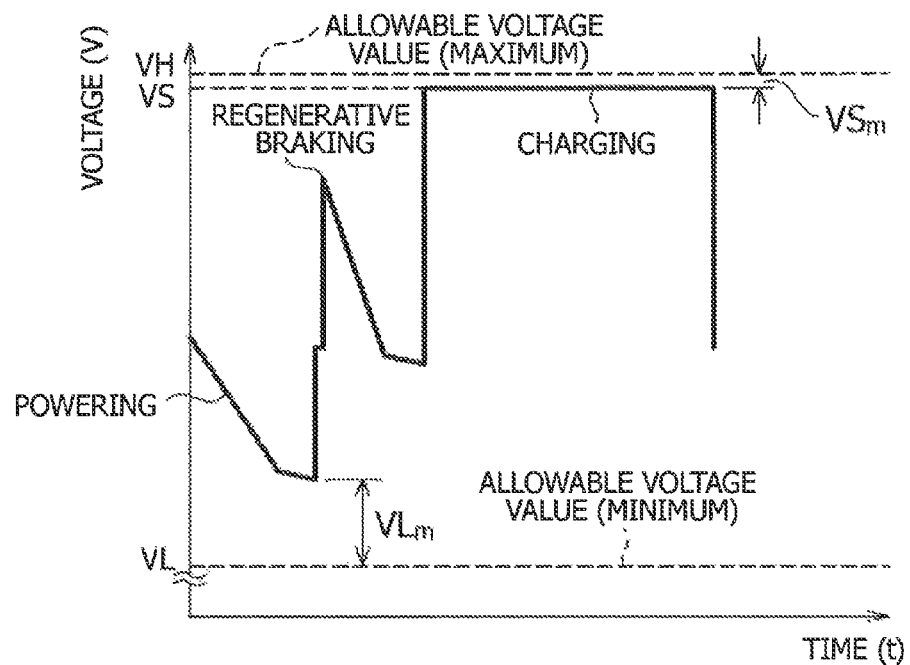
FIG. 2 A graph illustrating a charging method for a transportation vehicle without a contact wire according to a first embodiment of the present invention, illustrating the relationship between a voltage value of an energy storage device and time when the vehicle runs and stops (to charge).
Figure 3:
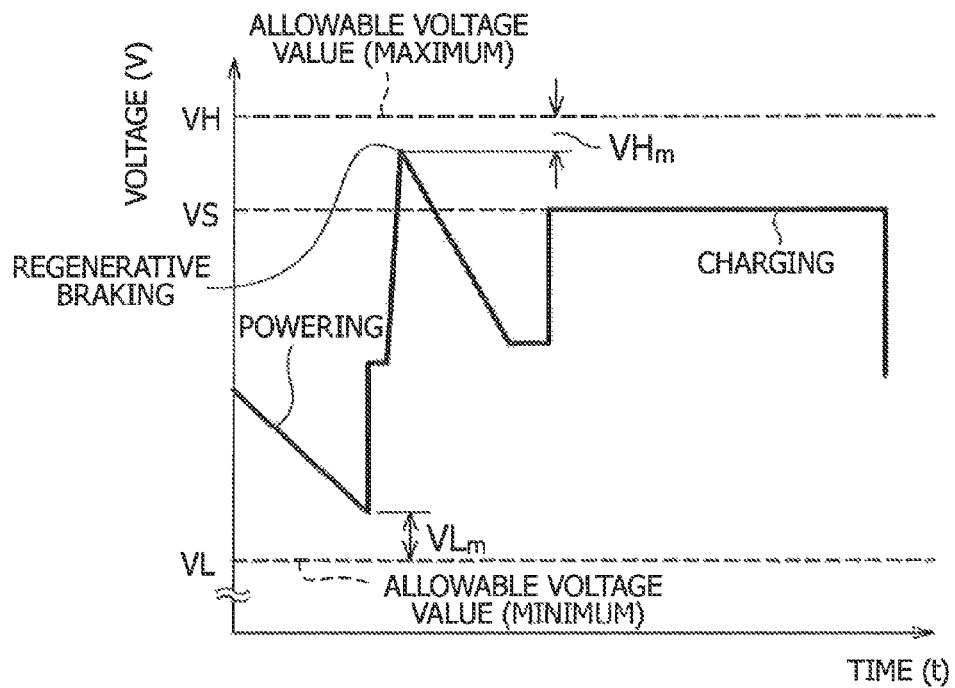
FIG. 3 A graph illustrating a charging method for a transportation vehicle without a contact wire according to a second embodiment of the present invention, illustrating the relationship between a voltage value of the energy storage device and time when the vehicle runs and stops (to charge) in a case in which the vehicle leaves a high-altitude station toward a low-altitude station.

Furthermore, in the energy storage device 5, a maximum allowable voltage value VH and a minimum allowable voltage value VL are set in advance as allowable voltage values (see FIGS. 2 and 3). In the energy storage device 5, if a voltage value keeps out of the range between the maximum allowable voltage value VH and the minimum allowable voltage value VL, an interlock function (not shown) operates to disable power supply.

On the other hand, on the ground side, a supporting frame 6 standing adjacent to track 2 is provided. The supporting frame 6 is provided with a current feeding contactor 7 at a position to oppose the current collection contactor 4 when the vehicle 1 makes a stop. The current feeding contactor 7 is connected to a charging device 9 provided on the ground side through a power line 8 which is buried in the ground. The charging device 9 includes a control means 10, and the control means 10 controls power supplied from the charging device 9 to the energy storage device 5.

With the configuration above, when the vehicle 1 stops at the station, the current collection contactor 4 and the current feeding contactor 7 are brought into contact with each other so that the power supplied from the charging device 9 on the ground side is stored in the energy storage device 5.

First Embodiment

Now referring to the drawings, a charging method for a transportation vehicle without a contact wire according to a first embodiment of the present invention is described below. FIG. 2 is a graph illustrating the charging method for a transportation vehicle without a contact wire according to the first embodiment of the present invention, illustrating the relationship between a voltage value V of the energy storage device 5 and time t when the vehicle runs and stops (to charge).

As illustrated in FIG. 2, in this embodiment, the control means 10 of the charging device 9 controls such that the energy storage device 5 is charged with a voltage set value VS which is near the maximum allowable voltage value VH of the energy storage device 5. In other words, in this embodiment, the charging device 9 charges the energy storage device 5 with the voltage set value VS which is near the maximum allowable voltage value VH of the energy storage device 5.

Note that the charging is generally performed by constant current-constant voltage (CC-CV) charging. The CC-CV charging as used herein is a charging method in which charging is first performed in a constant current (CC) mode until a set voltage (CV value) is reached, and when the set voltage is reached, the mode shifts to a constant voltage (CV) mode to gradually reduce a current value. The voltage set value VS of the present invention means the CV value. FIG. 2 illustrates an example in which the CV mode is started immediately after the charging.

In the transportation system according to this embodiment, the track 2 on which the vehicle 1 runs is determined in advance, and hence it is possible to know in advance how the voltage value V of the energy storage device 5 fluctuates between the stations during powering or regenerative braking. Therefore, the voltage set value VS of the charging device 9 is determined based on the fluctuation conditions of the voltage value V of the energy storage device 5 between the stations. For example, the voltage set value VS is set to a value satisfying the following expression.

$$VS_m \leq VL_m \qquad \text{Expression 1}$$

Here, as illustrated in FIG. 2, $VS_m$ is a margin between the voltage set value VS and the maximum allowable voltage value VH, and $VL_m$ is a margin between a minimum value of the voltage value V of the energy storage device 5 while the vehicle is in service (i.e., a voltage value during powering) and the minimum allowable voltage value VL.

Note that, in this embodiment, the charging device 9 charges the energy storage device 5 with the voltage set value VS, but the charging is not limited to the one performed with a constant voltage by fixing the voltage set value VS satisfying Expression 1 above. The charging device 9 may charge the energy storage device 5 by varying the voltage set value VS within the range satisfying Expression 1 above.

Figure 4:
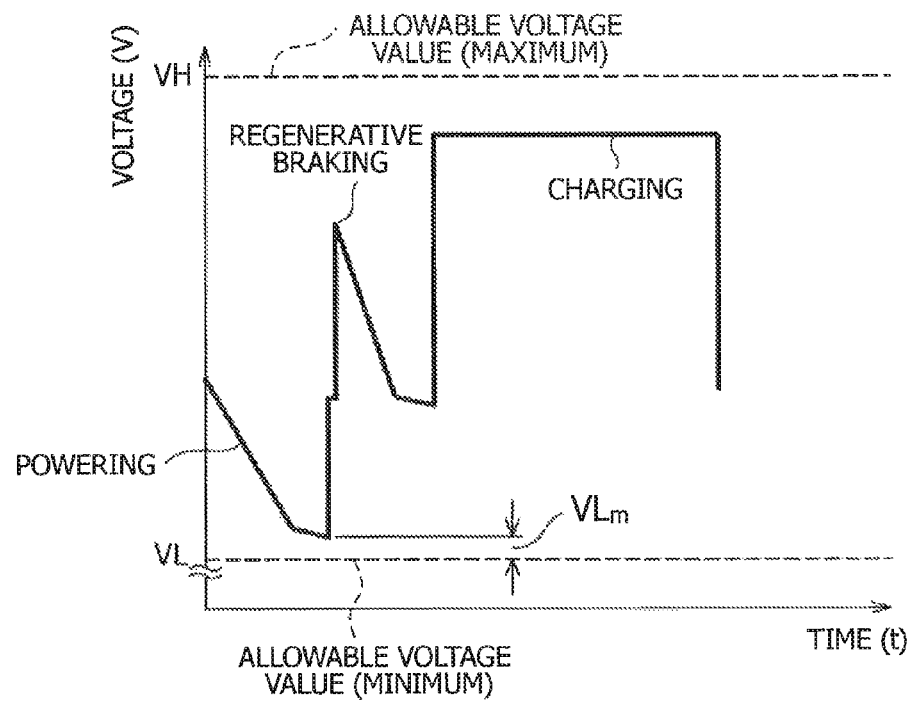
FIG. 4 A graph illustrating the relationship between a voltage value of the energy storage device and time in a case in which the vehicle leaves a station in a conventional charging method for a transportation vehicle without a contact wire.
Figure 5:
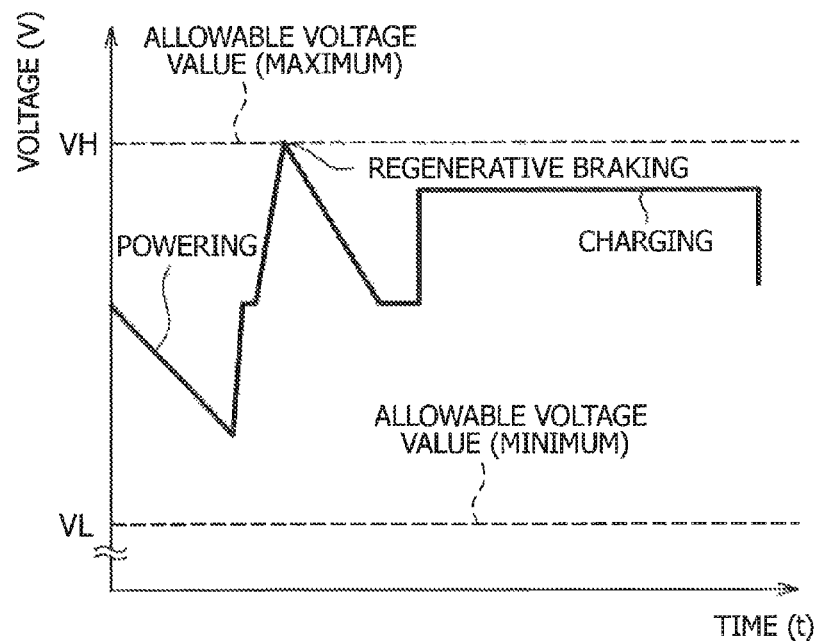
FIG. 5 A graph illustrating the relationship between a voltage value of the energy storage device and time in a case in which the vehicle leaves a high-altitude station toward a low-altitude station in the conventional charging method for a transportation vehicle without a contact wire.

According to the charging method for a transportation vehicle without a contact wire according to this embodiment, the charging device 9 charges the energy storage device 5 with the voltage set value VS which is near the maximum allowable voltage value VH of the energy storage device 5, and hence, as illustrated in FIG. 2, the voltage value V of the energy storage device 5 at the time of leaving the station is greater than the conventional one (the case of FIG. 4). Therefore, when the vehicle 1 leaves the station, even if the voltage value V of the energy storage device 5 decreases greatly toward the minimum allowable voltage value VL, the voltage value V of the energy storage device 5 can ensure the sufficient margin with respect to the minimum allowable voltage value VL of the energy storage device 5. Thus, there is no fear that the voltage value V of the energy storage device 5 will be less than the minimum allowable voltage value VL depending on usage or environment.

In this way, in the case in which the vehicle 1 runs between a plurality of stations, the energy storage device 5 can be used for a longer time within the range of the allowable voltage values, thereby prolonging the life (service life) of the energy storage device 5.

In addition, because the voltage is high overall, the current value is reduced correspondingly, thereby obtaining the energy-saving effect of reducing power consumption.

Second Embodiment

Now, referring to the drawings, a charging method for a transportation vehicle without a contact wire according to a second embodiment of the present invention is described below. FIG. 3 is a graph illustrating the charging method for a transportation vehicle without a contact wire according to the second embodiment of the present invention, illustrating the relationship between a voltage value V of the energy storage device 5 and time t when the vehicle runs and stops (to charge).

As illustrated in FIG. 3, in this embodiment, the control means 10 of the charging device 9 controls such that the energy storage device 5 is charged with a voltage set value VS. In other words, in this embodiment, the charging device 9 charges the energy storage device 5 with the voltage set value VS. Here, the voltage set value VS is set to such a voltage value that the voltage value V of the energy storage device 5 during powering of the vehicle 1 is greater than the minimum allowable voltage value VL of the energy storage device 5 and the voltage value V of the energy storage device 5 during regenerative braking of the vehicle 1 is less than the maximum allowable voltage value VH of the energy storage device 5.

Note that, in the transportation system according to this embodiment, the track 2 on which the vehicle 1 runs is determined in advance, and hence it is possible to know in advance how the voltage value V of the energy storage device 5 fluctuates between the stations during powering or regenerative braking. Therefore, the voltage set value VS of the charging device 9 is determined based on the fluctuation conditions of the voltage value V of the energy storage device 5 between the stations. For example, the voltage set value VS is set to such a value that a margin $VL_m$ of 5 to 30% can be ensured with respect to the minimum allowable voltage value VL during powering of the vehicle 1 and a margin $VH_m$ of 5 to 30% can be ensured with respect to the maximum allowable voltage value VH during regenerative braking of the vehicle 1.

Furthermore, the control method according to this embodiment can be used in combination with the method according to the above-mentioned first embodiment.

For example, in a case in which the energy storage device 5 is first charged by the method according to the first embodiment and then the voltage value V during regenerative braking approaches the maximum allowable voltage value VH, control may be performed to cut the peak during the regenerative braking so that the margin $VH_m$ of 5 to 30% can be ensured with respect to the maximum allowable voltage value VH. An example of the configuration for cutting the peak is a configuration which is equipped with resistors to cut the peak.

According to the charging method for a transportation vehicle without a contact wire according to this embodiment, the charging device 9 charges the energy storage device 5 with such a voltage set value VS that the voltage value V of the energy storage device 5 during powering of the vehicle 1 is greater than the minimum allowable voltage value VL of the energy storage device 5 and the voltage value V of the energy storage device 5 during regenerative braking of the vehicle 1 is less than the maximum allowable voltage value VH of the energy storage device 5. Therefore, for example, as illustrated in FIG. 3, when the vehicle 1 leaves a high-altitude station toward a low-altitude station, even if the voltage value V of the energy storage device 5 increases greatly toward the maximum allowable voltage value VH, the voltage value V of the energy storage device 5 can ensure the sufficient margin $VH_m$ with respect to the maximum allowable voltage value VH of the energy storage device 5. Thus, there is no fear that the voltage value V of the energy storage device 5 will be greater than the maximum allowable voltage value VH depending on usage or environment.

Furthermore, when the vehicle 1 leaves the station, even if the voltage value V of the energy storage device 5 decreases greatly toward the minimum allowable voltage value VL, the voltage value V of the energy storage device 5 can ensure the sufficient margin $VL_m$ with respect to the minimum allowable voltage value VL of the energy storage device 5. Thus, there is no fear that the voltage value V of the energy storage device 5 will be less than the minimum allowable voltage value VL depending on usage or environment.

In this way, in the case in which the vehicle 1 runs between a plurality of stations at different altitudes, the energy storage device 5 can be used for a longer time within the range of the allowable voltage values, thereby prolonging the life of the energy storage device 5.

The embodiments of the present invention are described above, but the present invention is not limited to the above-mentioned embodiments. Various modifications and changes can be made thereto based on the technical idea of the present invention.

In the above-mentioned embodiments, the energy storage device 5 of the vehicle 1 is configured to be charged in a contact manner. Alternatively, the energy storage device 5 of the vehicle 1 may be configured to be charged in a non-contact manner by means of the charging device 9 as a Charging power source that supplies high-frequency power.

REFERENCE SIGNS LIST 1 vehicle
2 track
3 truck
3a side surface of truck
4 current collection contactor
5 energy storage device
6 supporting frame
7 current feeding contactor
8 power line
9 charging device
10 control means
V voltage value of energy storage device
VL minimum allowable voltage value
VH maximum allowable voltage value
VS voltage set value
$VL_m$ margin between voltage value of energy storage device and minimum allowable voltage value
$VH_m$ margin between voltage value of energy storage device and maximum allowable voltage value
$VS_m$ margin between voltage set value and maximum allowable voltage value

The invention claimed is:

1. A charging method for a transportation vehicle without a contact wire, which is configured such that, when a vehicle running on a track and being equipped with an energy storage device and a regenerative brake, stops at a station on the track, the energy storage device of the vehicle is charged by a charging device provided on a ground side, the method comprising:

charging, by the charging device, the energy storage device with a voltage set value which is between a maximum allowable voltage value of the energy storage device and a minimum allowable voltage value thereof and is close to the maximum allowable voltage value, wherein the charging by the charging device includes charging the energy storage device with a voltage set value being set such that a voltage value of the energy storage device during powering of the vehicle is greater than the minimum allowable voltage value of the energy storage device and the voltage value of the energy storage device during regenerative braking of the vehicle is less than the maximum allowable voltage value of the energy storage device, wherein the voltage set value is set to a value satisfying the following expression: $VS_m \leq VL_m$, and wherein $VS_m$ is a margin between the voltage set value and the maximum allowable voltage value, and $VL_m$ is a margin between a minimum value of a voltage value of the energy storage device while the vehicle is in service and a minimum allowable voltage value.

2. The charging method according to claim 1, wherein the voltage set value is set to ensure such a value that a margin of 5% to 30% with respect to the minimum allowable voltage value during powering of the vehicle and that a margin of 5% to 30% with respect to the maximum allowable voltage value during regenerative braking of the vehicle.

3. A charging system for a transportation vehicle without a contact wire, which is configured such that, when a vehicle running on a track and being equipped with an energy storage device and a regenerative brake, stops at a station on the track, the energy storage device of the vehicle is charged by a charging device provided on a ground side, wherein the charging device comprises control means, and the control means controls such that the energy storage device is charged with a voltage set value which is between a maximum allowable voltage value of the energy storage device, and a minimum allowable voltage value thereof and is close to the maximum allowable voltage value, wherein the control means controls such that the energy storage device is charged with a voltage set value being set such that a voltage value of the energy storage device during powering of the vehicle is greater than the minimum allowable voltage value of the energy storage device and the voltage value of the energy storage device during regenerative braking of the vehicle is less than the maximum allowable voltage value of the energy storage device, wherein the voltage set value is set to a value satisfying the following expression: $VS_m \leq VL_m$, and wherein $VS_m$ is a margin between the voltage set value and the maximum allowable voltage value, and $VL_m$ is a margin between a minimum value of a voltage value of the energy storage device while the vehicle is in service and a minimum allowable voltage value.

4. The charging system according to claim 3, wherein the voltage set value is set to ensure such a value that a margin of 5% to 30% with respect to the minimum allowable voltage value during powering of the vehicle and that a margin of 5% to 30% can be ensured with respect to the maximum allowable voltage value during regenerative braking of the vehicle.

* * * * *